Sept. 1, 1964 E. K. STODOLA 3,147,476
LONG RANGE RADAR RANGING SYSTEM
Filed May 28, 1959 4 Sheets-Sheet 1
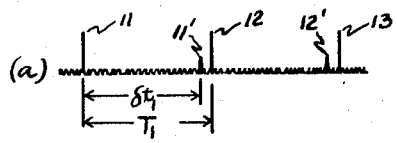
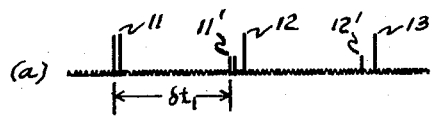
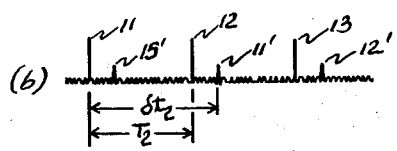
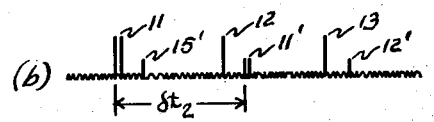
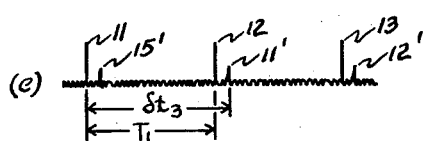
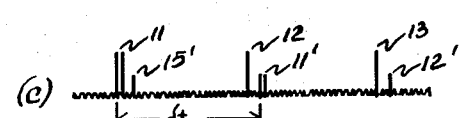
Fig-1   Fig-2
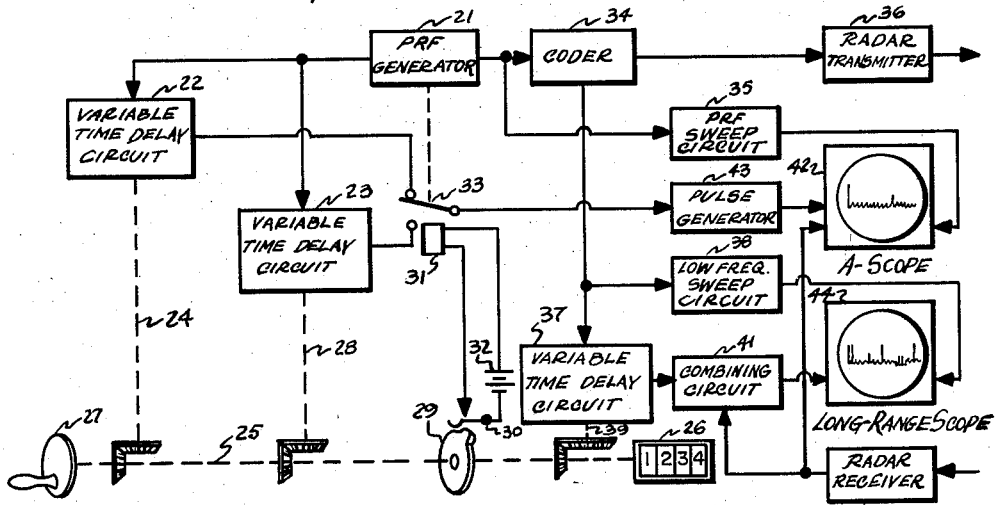
Fig-3
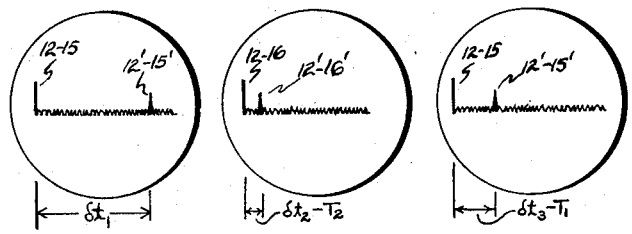
Fig-7
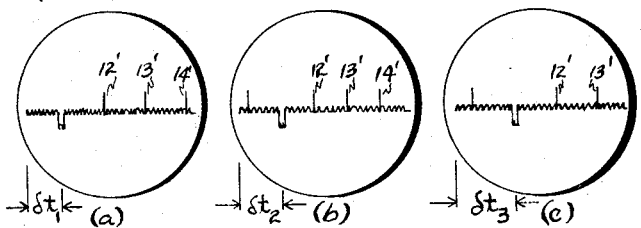
INVENTOR
BY Edwin K. Stodola
B. F. Spencer
AGENT

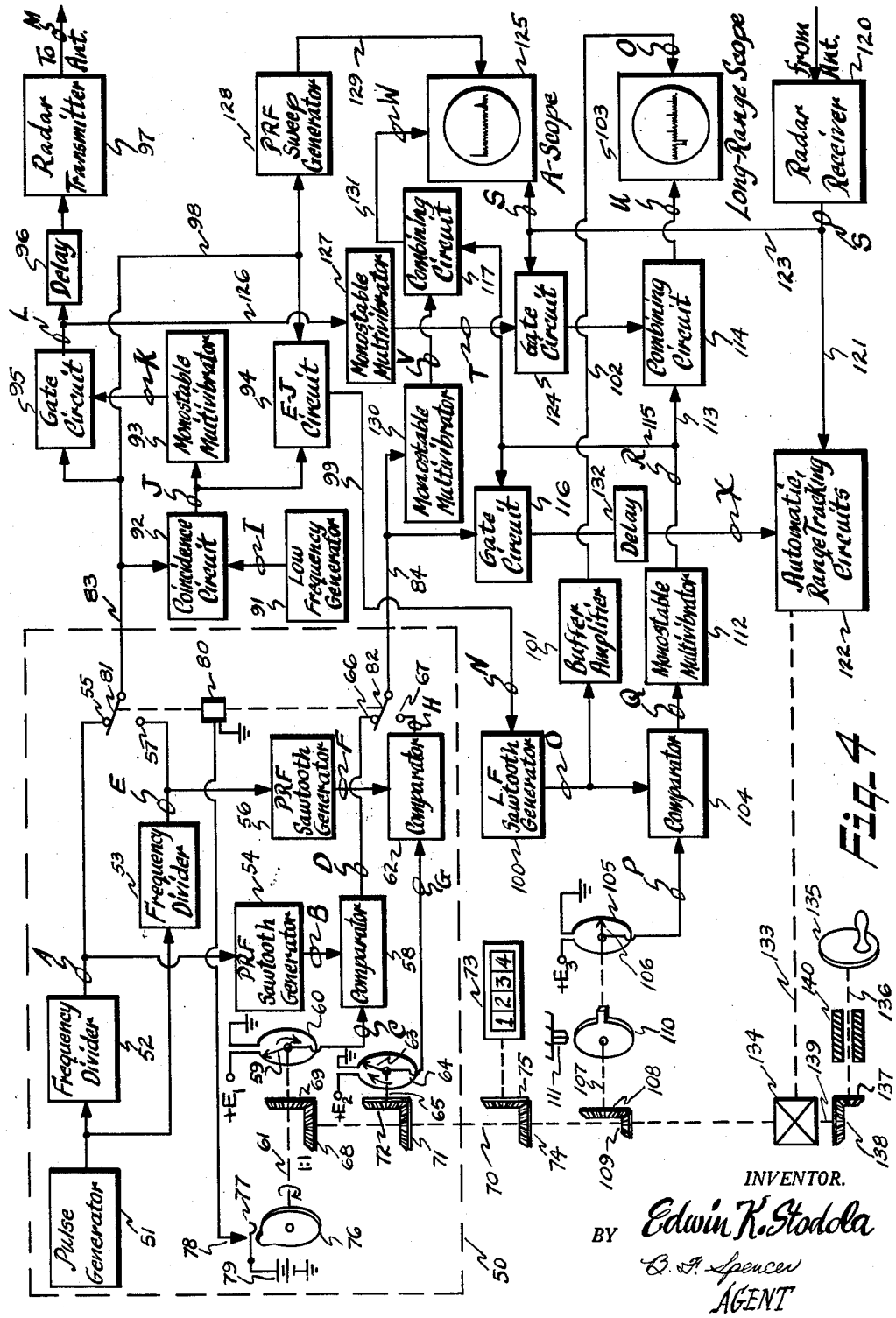

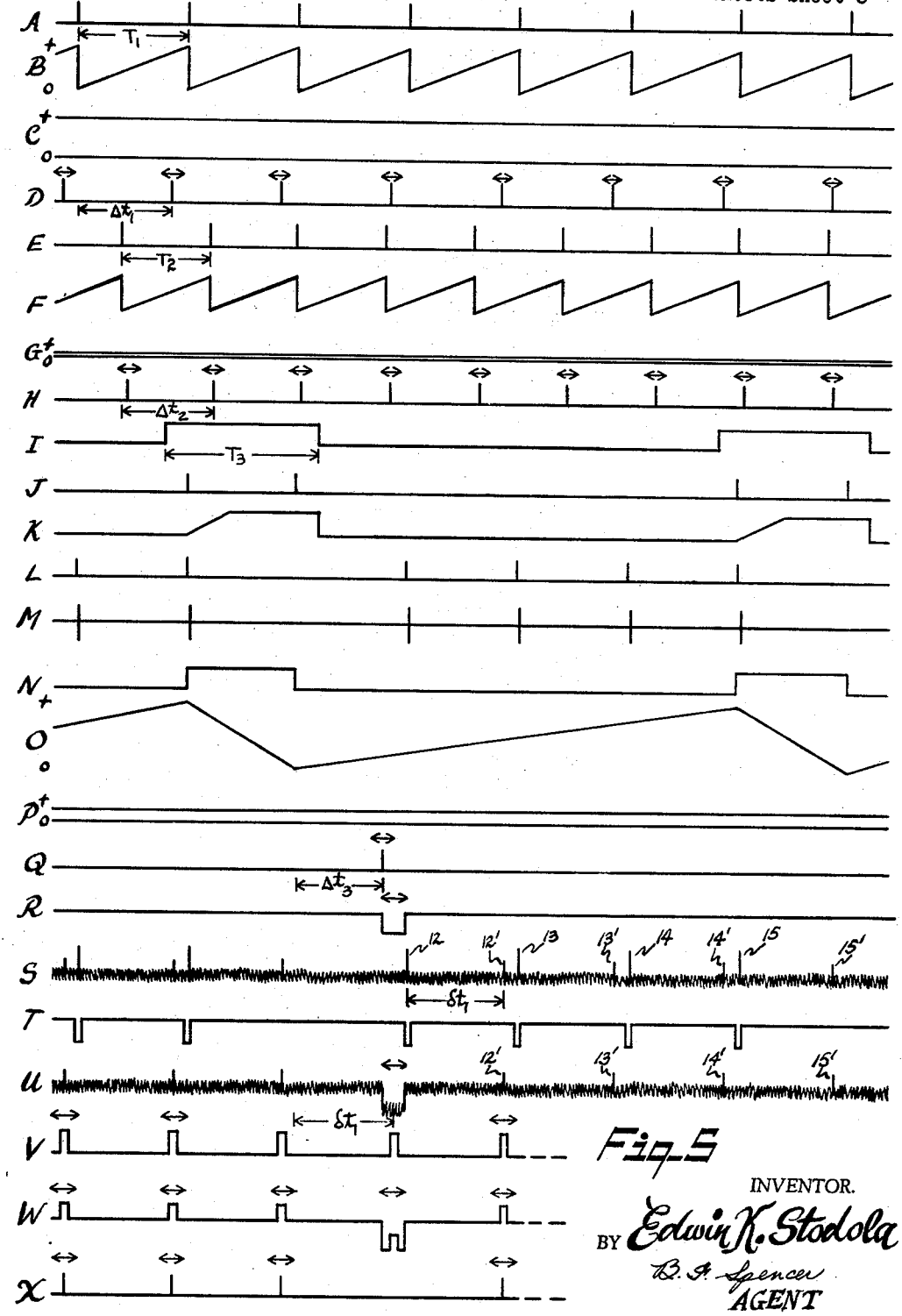

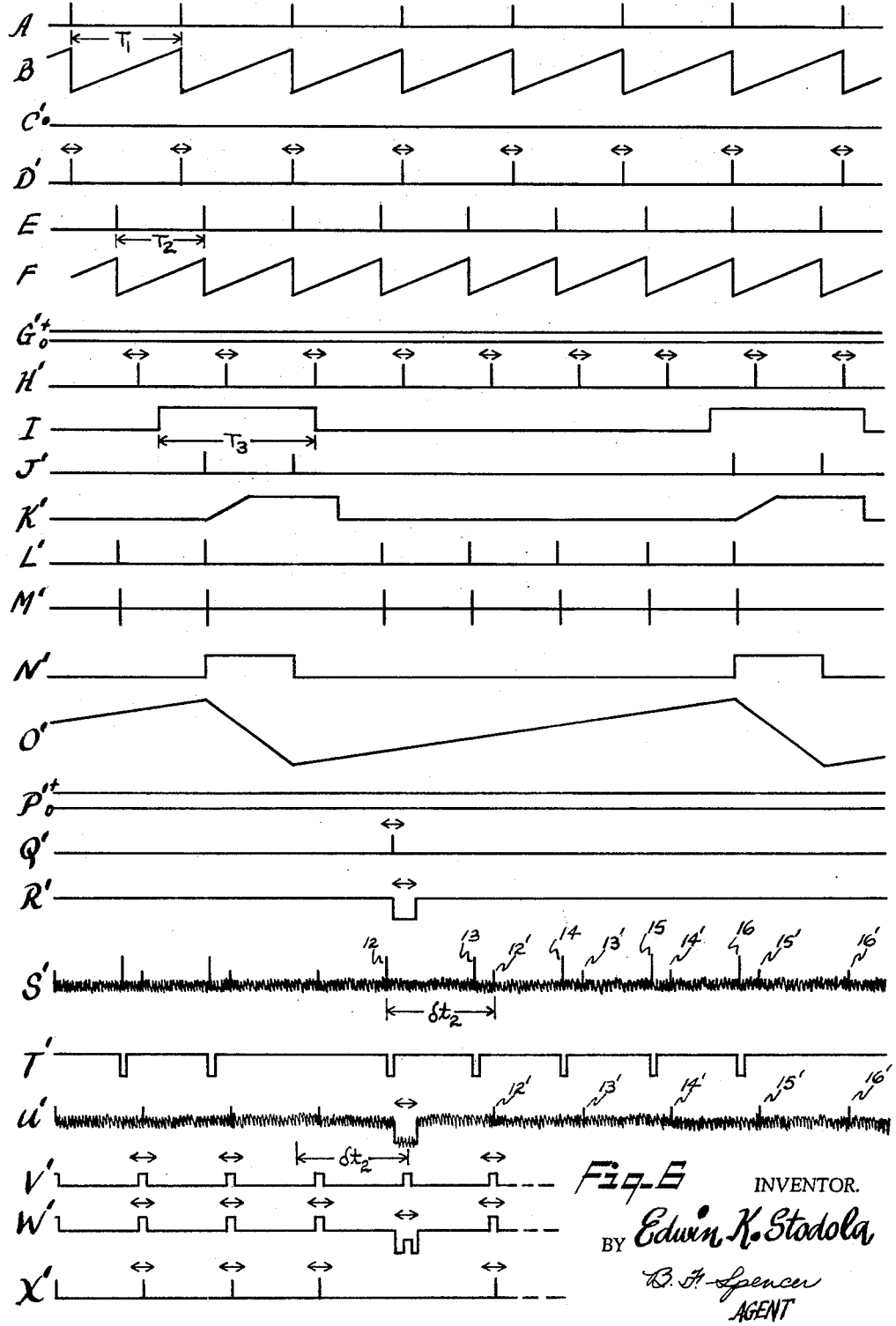

United States Patent Office 3,147,476
Patented Sept. 1, 1964

3,147,476
LONG RANGE RADAR RANGING SYSTEM
Edwin King Stodola, Northport, N.Y., assignor, by mesne assignments, to Dynamics Corporation of America, New York, N.Y., a corporation of New York
Filed May 28, 1959, Ser. No. 817,437
22 Claims. (Cl. 343—7.3)

The present invention relates to improved radar systems, and in particuar to a ranging system for a long-range pulse radar system.

The conventional pulse radar system radiates recurrent narrow pulses of radio-frequencey energy toward a remote object and receives reflected echo pulses from the object which arrive at the radar system delayed in time according to the distance between the radar system and the object. This distance or range is determined by measuring the time delay interval between the instant of transmission of a narrow radio-frequency pulse and the instant the corresponding reflected echo pulse arrives back at the radar system. The time delay interval may be measured by an oscilloscope or by a precision range measuring system.

The maximum range which may be measured by an oscilloscope or by the conventional range measuring system is determined in part by the radar pulse repetition frequency. For example, if a radar system has a pulse repetition frequency of 500 pulses per second, 2000 microseconds of time elapses between transmitted pulses. If an object whose range to be measured is situated 186 miles from the radar system, 1000 micrseconds of time is required for a transmitted pulse leaving the radar antenna to arrive at the object, and 1000 microseconds is required for the corresponding reflected echo pulse to return to the radar system. Thus, the reflected pulse arrives at the radar system at the same instant that the radar is transmitting the next succeeding radar pulse, and the very weak reflected echo pulse is completely obliterated by the succeeding high-power radar pulse.

In practice, a conventional pulse radar system can be designed to measure the range to an object provided the range is such that the total radar travel time out and back is somewhat less than the radar period or pulse recurrence interval. However, if the range of the object is greater than this maximum range, reflected echo pulses will arrive at the radar system with a time delay interval greater than the radar period. This results in an ambiguity of range measurement since the oscilloscope or precision range measuring system cannot distinguish between reflected echo pulses which arrive at the radar system only a short time interval after each transmitted radar pulse from the reflected echo pulses which arrive at the radar system the short time interval plus one or more pulse recurrence intervals, as will become more apparent hereinafter.

One solution to this maximum range problem has been to reduce the radar pulse repetition frequency as the range of the object increases. However, for extremely long ranges this solution has not been entirely satisfactory because the average power of the radar system is low at low duty cycles and the signal-to-noise ratio for the entire radar system is much less than desired. To assure precise automatic angle tracking as well as automatic range tracking, a high signal-to-noise ratio is desired. The present invention introduces an improved solution to this problem.

Accordingly, the principal object of the invention is to provide an improved long-range radar system.

Another object is to provide a high repetition frequency long-range radar system having an unambigious range measuring system.

Still another object is to provide a long-range radar system having a high signal-to-noise ratio.

Yet another object is to provide an improved direct-reading range measuring unit for a long-range radar system.

A further object is to provide an improved automatic tracking system for a long-range radar system.

An additional object is to provide an improved radar system having an increased pulse repetition frequency without a reduction in the maximum range tracking capability of the system.

In accordance with the present invention there is introduced an improved long-range radar system possesing a high pulse repetition frequency together with a high signal-to-noise ratio but without the problem of range ambiguity briefly mentioned above. This improved radar system employs a radar transmitter operating, in sequence, at a plurality of pulse repetition frequencies and cooperating with a range measuring unit capable of continuous and accurate time delay measurements at any of the several repetition frequencies. The range measuring unit while tracking a movable target in range, whether automatically or manually, selects according to predetermined range measuring intervals the desired pulse repetition frequency at which the radar transmitter is to operate. This selection of the desired pulse repetition frequency is achieved without loss of the target echo pulse being tracked. The improved radar system operates at very high pulse repetition rates resulting in a higher signal-to-noise ratio, and is provided with relatively simple appartus for the elimination of range ambiguity.

The above objects of and the brief introduction to the present invention will be more fully understood and further objects and advantages will become apparent from a study of the following detailed description in connection with the drawing, wherein:

FIGS. 1a, 1b, and 1c illustrate the waveforms of recurrent transmitted and received echo pulses at a first pulse repetition rate, a second pulse repetition rate, and then the first repetition rate, respectively, while the range to the target is progressively increasing.

FIGS. 2a, 2b, and 2c illustrate the waveforms of recurrent coded transmitted and received echo pulses at first and second pulse repetition rates as the range to the target increases, FIG. 3 is a block diagram of a simplified long-range radar system in accordance with the invention, FIG. 4 is a detailed block diagram of a long-range automatic tracking radar system in accordance with the invention, FIG. 5 is a first group of waveforms associated with the block diagram of FIG. 4, FIG. 6 is a second group of waveforms associated with the block diagram of FIG. 4, and FIGS. 7a, 7b, and 7c illustrate, respectively, three views of the A-scope and the long-range scope of the system of FIG. 4 as the range of the object progressively increases.

Referring to FIG. 1, there is shown for purposes of illustration three views of recurrent radar transmitted pulses 11–13 and corresponding received target echo pulses 11' and 12', as received by a radar station, as the range to the target progressively increases. In FIG. 1a, the conventional radar transmitter pulse 11 is transmitted toward the target and the corresponding target echo pulse 11' arrives at the radar station after the elapsed time delay interval $\delta t_1$. The range to the target is directly proportional to the interval $\delta t_1$, and target range may be measured as $\delta t_1$ varies in value from a few microseconds up to almost the radar pulse recurrence interval or period $T_1$. If the range to the target should increase such that the time delay interval $\delta t_1$ of FIG. 1a becomes equal to the pulse recurrence interval $T_1$ of the transmitted radar pulses, the received target pulse 11' would coincide in time with the transmitted pulse 12, the target pulse 12' would coincide with the transmitted pulse 13, and these target pulses would be completely obliterated. This problem exists with the conventional pulse radar system and prevents measurement of the range to the target where the time delay interval $\delta t_1$ equal to or approximately equal to the radar pulse recurrence interval.

Referring to FIG. 1b, the transmitted radar pulse 11 arrives at the radar station as reflected target pulse 11' following the transmission of radar pulse 12. In other words, the time delay intervals $\delta t_2$ is larger than the radar pulse recurrence interval $T_2$. A comparison of FIGS. 1a and 1b will show that the period $T_2$ of the radar pulses 11–13 of FIG. 1b is less than the period $T_1$ in FIG. 1a, and that the time delay interval $\delta t_2$ of FIG. 1b has been selected to be equal to the period $T_1$ of FIG. 1a. From this comparison it is apparent that a target whose time delay interval is $\delta t_2$ is not obliterated by the transmitted pulse 12 if the pulse recurrence interval is changed to that of FIG. 1b before the time delay interval $\delta t_1$ coincides with the radar period $T_1$ of FIG. 1a. The present invention is based upon this fundamental principle and provides a system for automatically changing the radar pulse repetition frequency or pulse recurrence interval as a function of the range to be measured.

In FIG. 1c, the time delay interval of the target whose range is to be measured has increased to $\delta t_3$ and the pulse recurrence interval or period is again equal to that of FIG. 1a, namely $T_1$. Thus, once the time delay interval to be measured exceeds the radar pulse recurrence interval $T_1$ the original pulse recurrence interval may be restored. The range to the target is directly proportional to the time delay interval $\delta t_3$ of FIG. 1c as this time delay varies from a value slightly greater than the pulse recurrence interval $T_1$ up to a value slightly less than twice the pulse recurrence interval $T_1$. When $\delta t_3$ approaches twice the pulse recurrence interval $2T_1$, i.e. target pulse 11' approaches transmitted pulse 13, the radar pulse recurrence interval is again reduced to the value $T_2$ until the interval at which transmitter interference occurs is passed.

The present invention provides a system for continuously measuring the range to a target as the time delay interval $\delta t$ varies from a few microseconds to a time delay interval representing many radar periods without loss of the target being tracked. To accomplish this objective, the precision range measuring circuits of the present invention are operable at each selected pulse repetition rate or recurrence interval without loss of the reference pulses from which the time delay interval $\delta t$ is measured, as will become apparent hereinafter.

To achieve the above objects, an additional problem must be solved which may be illustrated by referring to FIG. 1b and to FIG. 2. In FIG. 1b, the desired time difference interval representing the range to the target is $\delta t_2$. However, a conventional radar ranging system would not measure this time interval without possible ambiguity because of the presence of target echo pulse 15'. The conventional ranging system would measure instead the time difference interval between transmitted pulse 11 and target pulse 15' which also corresponds to the time difference interval between transmitted pulse 12 and target pulse 11'. In certain of the conventional automatic radar ranging systems, the ranging system is arranged to automatically scan out in range and to lock to the nearest target. In such systems, the time delay interval $\delta t_2$ would not be measured. Therefore, if a conventional ranging system were to be used, the measured range would be in error by an amount representing one or more recurrent intervals $T_2$. This problem also exists in FIG. 1c where a conventional ranging system would, similarly, measure the time delay interval between transmitted pulse 11 and the target pulse 15'. The extent of this problem may be better appreciated where the target is situated at extremely long ranges and $\delta t$ extends over many radar pulse recurrence intervals. Under this condition, it would be impossible with the conventional pulse radar ranging system to determine the correct target pulse upon which to make the time difference measurement.

In FIG. 2, the transmitted pulse 11 has been coded by the addition of a second pulse closely following the first pulse. Transmitted pulses 12 and 13 are not coded. As a result, the reflected target pulse 11' corresponding to the coded transmitted pulse 11 is likewise coded.

Now, in FIG. 2b, the correct time delay interval $\delta t_2$ can be measured without ambiguity because the target pulse 11' can be distinguished from the target pulses 15', 12' etc. Similarly, the correct time delay interval $\delta t_3$ in FIG. 2c can be correctly measured. The present invention makes use of coding to enable the precision range measuring circuits to measure the correct range to the target being tracked without ambiguity over many radar pulse recurrence intervals, as will become apparent hereinafter. It should be noted that many coding schemes are available to the designer and the one selected here is for the purpose of illustration.

Referring now to FIG. 3, there is shown a simplified block diagram of a radar system in accordance with the present invention which is useful for explaining the principles involved. PRF generator 21 is adapted for operation at two different fixed pulse recurrence intervals or periods $T_1$ and $T_2$. Recurrent pulses are coupled from generator 21 to the inputs of variable time delay circuits 22 and 23, the first delay circuit 22 operating at the recurrence interval $T_1$ and the second delay circuit 23 operating at the recurrence interval $T_2$. The first delay circuit 22 produces variably delayed output or ranging pulses whose time delay is determined by the setting of shafts 24 and 25 as indicated by the time delay or range indicator 26. The amount of time delay is under the control of hand crank 27 which sets the angular position of shaft 24. Similarly, the second delay circuit 23 produces variably delayed output or ranging pulses whose time delay is determined by the setting of shaft 28.

The variable time delay circuits 22 and 23 may be continuously rotatable phase shifters or they may be linear saw-tooth delay generators. It is important, however, that the rate of change of time delay introduced by delay circuit 22 as shaft 24 is being positioned be the same as the rate of change of time delay introduced by delay circuit 23 as shaft 28 is being positioned even though they operate at different pulse recurrence intervals. Thus, if delay circuits 22 and 23 are continuously rotatable phase shifters, the bevel gears coupling shaft 28 to shaft 25 will have a different gear ratio from the gears coupling shaft 24 to shaft 25.

One revolution of shafts 24 and 25 represents a time delay of one pulse recurrence interval $T_1$. Cam 29 attached to shaft 25 closes switch contact 30 once each revolution thereby actuating relay 31 by the energy from battery 32. Upon actuation of the relay 31, arm 33 is coupled to the output of delay circuit 23, and the recurrence interval of PRF generator 21 is changed from $T_1$ to $T_2$. The cam 29 is angularly aligned upon shaft 25 so that this change in pulse recurrence interval occurs when the time delay interval $\delta t$ of delay circuit 22 is greater than the recurrence interval $T_2$ but less than the interval $T_1$, and the relay 31 remains closed until the time delay interval $\delta t$ exceeds the interval $T_1$. Thereafter, switch contact 30 opens, relay 31 returns to its unenergized condition, and the original pulse recurrence interval $T_1$, is restored. Thus, the pulse recurrence interval $T_2$ is used only when the range of a target is such that the time delay interval $\delta t$ is approximately equal to the radar pulse recurrence interval $T_1$ where transmitter interference with received target pulses would occur, as explained above in connection with FIG. 1. Cam 29, therefore, controls the selection of one of the pulse recurrence intervals $T_1$ or $T_2$ in accordance with the time delay interval introduced by the variable time delay circuits 22 and 23 such that transmitter interference with the received target pulses cannot occur. The variably delayed pulses selected by arm 33 of relay 31 are range or strobe pulses and are used to assist the operator in measuring the range to a selected target as will be explained hereinafter.

The recurrent output pulses from PRF generator 21 are coupled to coder 34 and to PRF sweep circuit 35. Coder 34 recurrently codes one of the pulses from generator 21, for example every fifth or sixth pulse depending upon the frequency of PRF generator 21. This coding may, for example, be the addition of a pulse immediately following a regularly occurring pulse as explained above in connection with FIG. 2. The coded output pulses are coupled to a radar transmitter 36 producing radar output pulses which are coupled to a conventional radar antenna (not shown) and radiated into space.

Coder 34 provides recurrent low-frequency pulses, occuring once each five or six pulses of the radar pulse repetition freqency, and these low-frequency pulses are coupled to a low-frequency variable time delay circuit 37 and to low-frequency sweep circuit 38. The low-frequency delay circuit 37 operates at a fixed frequency less than the pulse repetition frequency. The choice of this fixed frequency is determined by the maximum range at which the ranging system of the invention is to operate. It may be chosen such that many pulses at the radar pulse repetition frequency occur within one period of the low-frequency pulses.

The low-frequency variable time delay circuit 37 produces variably-delayed output pulses whose time delay is determined by the setting of shaft 39, as indicated by the time delay or range indicator 26. The rate of change and the amount of time delay introduced by the delay circuit 37 during the first revolution of shaft 25 is substantially the same as the rate of change and the amount of time delay introduced by the delay circuit 22. However, during the second revolution of shaft 25, the amount of time delay introduced by the low-frequency delay circuit 37 is substantially equal to one recurrence interval $T_1$ of the radar pulse repetition frequency plus the time delay introduced by the variable time delay circuit 22. Thus, the low-frequency delay circuit 37 operates as a coarse ranging system and provides a method for resolving or preventing ambiguity of the fine ranging pulses produced by the variable delay circuits 22 and 23, as will be explained hereinafter.

The gear ratio between shafts 39 and 25 is determined by the type of time delay circuit 37 and the ratio of the radar pulse repetition frequency to the fixed frequency at which the delay circuit 37 is to operate. If the delay circuits 22 and 37 are of the same type such that one revolution of shaft 24 produces a time delay in delay circuit 22 equal to the period $T_1$ and one revolution of shaft 39 produces a time delay in delay circuit 37 equal to one period of the fixed low frequency, then the gear ratio is selected so that shaft 39 makes one revolution for $n$ revolutions of shaft 24, where $n$ is the ratio of the pulse repetition frequency at which delay circuit 22 operates to the low frequency at which delay circuit 37 operates.

Conventional radar receiver 40 receives reflected target pulses which after detection and amplification are coupled to combining circuit 41 and to the vertical deflection circuits of a conventional A-scope 42. The horizontal sweep for the A-scope is produced by the PRF sweep circuit 35 operating at the radar pulse repetition frequency selected by relay 31. Pulse generator 43 produces intensifying ranging pulses at the selected radar pulse repetition frequency, and the time delay of these intensifying pulses is under the control of one of the delay circuits 22 or 23. These intensifying pulses are applied as range marker pulses to the A-scope to intensify or mark the cathode-ray trace.

Combining circuit 41 combines the target echo pulses with the low-frequency delayed ranging pulses from delay circuit 37, and the combined pulses are applied to the vertical deflection circuits of a long-range scope 44. A low-frequency horizontal sweep voltage from sweep circuit 38 is applied to the horizontal deflection circuits of the long-range scope 44. The low-frequency long-range rangings pulses may be displayed upon the long-range scope as a negative pulse or strobe in order to distinguish it from the received target pulses.

In the operation of the simplified system of FIG. 3, the operator examines the display upon the face of the long-range scope 44 to locate the received coded target pulse, i.e. the double pulse. The hand crank 27 is adjusted until the long-range strobe pulse produced by delay circuit 37, which may be a negative pulse, coincides with the received coded target pulse. Upon correct adjustment, the range indicator 26 provides a first coarse indication of the range of the target within the accuracy of the low-frequency coarse ranging system. The operator next examines the display of A-scope 42 and readjusts hand crank 27 until the PRF intensifying pulses, under the control of one of the delay circuits 22 or 23, intensifies the selected target pulse. Range indicator 26 now indicates the range of the target within the accuracy of the fine ranging system and the setting of the intensifying pulse. The range measurement is free of ambiguity and no transmitter interference occurs with the desired received target pulses.

A more detailed block diagram of a long-range automatic range tracking radar system in accordance with the invention is shown in FIG. 4. Waveforms associated with the system of FIG. 4 which will be useful in explaining its operation are shown in FIGS. 5 and 6. The same fundamental principles upon which the simplified system of FIG. 3 is based also are applicable to the system of FIG. 4.

Referring now to FIG. 4, the PRF ranging system 50 includes a pulse generator 51 producing recurrent output pulses at a frequency, for example, of 2000 pulses per second. These recurrent pulses are coupled to first and second frequency dividers 52 and 53. Frequency divider 52 divides the frequency of the recurrent pulses by a factor, for example, of five, and supplies recurrent pulses of waveform A, as illustrated in FIGS. 5 and 6, to the PRF saw-tooth generator 54 and to relay terminal 55. Frequency divider 53 divides the frequency of the recurrent pulses by a factor, for example, of four, and supplies recurrent pulses of waveform E to the PRF saw-tooth generator 56 and to relay terminal 57. The period of the recurrent pulses of waveform A will be referred to as $T_1$ and the period of the pulses of waveform E as $T_2$. The pulses of waveforms A and E are the basic PRF timing pulses of the radar system. However, they are not used simultaneously but are used in the alternative in the same general manner as explained above in connection with the simplified system of FIG. 3.

Variably delayed ranging pulses at each of the two basic timing frequencies are produced in a manner now to be described. PRF saw-tooth generator 54 produces a linear saw-tooth voltage of waveform B having a magnitude that is maintained substantially constant. This saw-tooth voltage, having a period $T_1$, is supplied to an amplitude comparator 58, such as a multiar, which produces variably-delayed output pulses of waveform D occurring at the instants that the instantaneous magnitude of the saw-tooth voltage B exceeds the magnitude of the applied direct voltage C. The direct voltage C is obtained from the arm 59 of linear potentiometer 60. The magnitude of the voltage C is determined by the setting of arm 59 under the control of shaft 61 and by the value of the voltage $+E_1$ supplied to the potentiometer. The voltage $+E_1$ is maintained constant and equal to the peak value of the saw-tooth voltage B.

Similarly, PRF saw-tooth generator 56 produces a linear saw-tooth voltage of waveform F having a magnitude that is maintained substantially constant. This saw-tooth voltage, whose period is $T_2$, is supplied to an amplitude comparator 62 which produces recurrent variably-delayed output pulses of waveform H. The timing of the pulses of waveform H is determined by the magnitude of the direct voltage G obtained from the arm 63 of linear potentiometer 64. The setting of arm 63 is determined by the angular position of shaft 65. The voltage $+E_2$ supplied to potentiometer 64 is maintained constant and equal to the peak value of the saw-tooth voltage F.

The recurrent variably-delayed pulses of waveform D are coupled to relay terminal 66, and the pulses of waveform H are coupled to relay terminal 67. These delayed pulses of waveforms D and H are strobe or ranging pulses, and are used in the determination of the range of the target to be measured, as will become apparent hereinafter. The variably-delayed pulses of waveform D are used with the timing pulses of waveform A, and the delayed pulses of waveform H are used with the timing pulses of waveform E.

The time delay interval $\Delta t_1$, or phase shift, between the pulses of waveform A and the pulses of waveform D is determined by the angular position of shaft 61; and the time delay interval $\Delta t_2$, or phase shift, between the pulses of waveform E and the pulses of waveform H is determined by the angular position of shaft 65. While the repetition frequency of the pulses of waveforms A and D are the same, it differs from the repetition frequency of the pulses of waveforms E and H in the ratio of four to five. It is important, however, that the time delay $\Delta t_1$ between waveforms A and D be the same as the time delay $\Delta t_2$ between waveforms E and H during the first revolution of shaft 65. It is necessary, therefore, that the shafts 61 and 65 be properly aligned to insure that these time delays are identical. In addition, the time delays $\Delta t_1$ and $\Delta t_2$ must be maintained equal as the shafts 61 and 65 are angularly positioned. This requirement is met by mechanically intercoupling shafts 61 and 65 in the correct ratio. Bevel gears 68 and 69 have a one-to-one ratio such that shaft 70 will have an angular position corresponding to the angular position of shaft 61. Bevel gears 71 and 72 have a five-to-four ratio such that four revolutions of shaft 70 correspond to five revolutions of shaft 65. This ratio is the same as the ratio of the pulse repetition frequency of waveforms E and H to the pulse repetition frequency of waveforms A and D. This assures that for a given change in time delay between the two waveforms A and D which is produced by a known change in the angular position of shaft 70 that the same given change in time delay will occur between the two waveforms E and H.

A time delay or range indicator 73 mechanically coupled to shaft 70 by the bevel gears 74 and 75 provides a measure of this time delay. The indicator, however, is calibrated in units of range and indicates the range to a target being tracked as will be explained hereinafter.

A cam 76 is attached to shaft 61 for closing a movable contact 77 against fixed contact 78 to select the desired radar pulse repetition frequency in accordance with the angular position of shaft 70, and, of course, in accordance with the indicated range of range indicator 73. Upon closure of member 77 against contact 78, the battery 79 energizes relay 80 causing relay arms 81 and 82 to be coupled to the fixed relay terminals 57 and 67, respectively. Thus, in the energized position of relay 80 the recurrent pulses of waveform E are coupled from the relay terminal 57 over relay arm 81 to the lead 83, and the variably delayed ranging pulses of waveform H are coupled from relay terminal 67 over relay arm 82 to the lead 84.

Cam 76 is aligned with the arm 59 of potentiometer 60 such that movable contact 77 closes against fixed contact 78 as the potentiometer arm 59 passes from the position shown in FIG. 4 through the "dead zone" of the potentiometer 60. Throughout the closure of movable contact 77 against fixed contact 78, the potentiometer arm 63 engages the usable region of potentiometer 64, and throughout this closure the recurrent timing pulses of waveform E are used. This alignment insures that the change in the radar pulse repetition frequency occurs at the proper range so as to avoid transmitter interference with the received target pulses being tracked, and further insures continuous uninterrupted automatic range tracking as will be more clearly understood hereinafter.

During the time that relay 80 is unenergized, the contacts 77 and 78 being open, the recurrent pulses of waveform A are coupled from terminal 55 over relay arm 81 to lead 83, and the variably-delayed ranging pulses of waveform D are coupled from terminal 66 over relay arm 82 to lead 84. It is apparent, therefore, that the selection of the basic radar pulse repetition frequency to be used is determined by the ranging system and that a selected first pulse repetition frequency is employed over certain predetermined increments of range while a second pulse repetition frequency is employed over the remaining increments of range. It is also apparent that many other forms or embodiments of the radar timing and ranging circuits based upon this principle could be employed to produce the timing pulses of waveforms A and E and the variably-delayed ranging pulses of waveforms D and H without departing from the spirit and scope of the invention.

Low-frequency timing and ranging pulses for the elimination or prevention of ambiguity are produced in a manner now to be described. Low-frequency generator 91 produces an output voltage represented by waveform I. The frequency of this output voltage is fixed and is appreciably less than the pulse repetition frequency of the timing pulses of waveforms A and D; and, as shown, is approximately one-fifth the frequency of the pulses of waveform A. The fixed frequency of the voltage of waveform I need not be integrally related to the frequency of the timing pulses of waveforms A or D and may be completely independent of the basic timing pulses.

Waveform I has a positive portion whose duration $T_3$ is greater than $T_1$, the period of the timing pulses of waveform A, and less than $2T_2$, twice the period of the timing pulses of waveform E. This choice of the duration $T_3$ enables the coincidence circuit 92 to select at least one and never more than two of the pulses of waveform A or of waveform E. Coincidence circuit 92, therefore, produces selected output pulses as shown by waveform J of FIG. 5 which have been selectively removed from the basic timing pulses of waveform A. These selected pulses are coupled to monostable multivibrator 93 and to an Eccles-Jordan or multivibrator circuit 94. Monostable multivibrator 93 is initiated by the first pulse of waveform J where two pulses have been selected as shown and the output gating voltage from this multivibrator is illustrated by waveform K. This output gating voltage is coupled to gating circuit 95 to which is also coupled either the timing pulses of waveform A or of waveform E depending upon the position of relay arm 81. Gating circuit 95 periodically gates out one and only one of the pulses of either waveform A or waveform E to produce the gated timing pulses of waveform L.

The gated timing pulses of waveform L are coupled through a delay circuit or delay line 96 to a conventional radar transmitter 97. The radar transmitter produces coded pulses of radio-frequency energy of waveform M which may be coupled to a suitable radar antenna (not shown) and radiated in space toward an object to be tracked. These radar pulses are coded by the periodic omission of a single radar pulse at the frequency of low-frequency generator 91. The basic pulse repetition frequency of the coded radar pulses of waveform M is determined by the position of relay arm 81 which in turn is controlled by the angular position of shaft 61.

The E–J circuit 94 receives the selected pulses of waveform J from coincidence circuit 92 and receives the basic timing pulses of either waveform A or waveform E over the leads 83 and 98. The first pulse of waveform J initiates the E–J circuit 94 and the next following pulse of waveform A coupled over leads 83 and 98 terminates the E-J circuit, as shown in FIG. 5. The output voltage of the E-J circuit appears as waveform N and is coupled over lead 99 to a low-frequency sawtooth generator 100.

Low-frequency sawtooth generator 100 produces a sawtooth voltage of waveform O of constant magnitude which is coupled through a buffer or isolation amplifier 101 and over lead 102 to the horizontal deflection circuits of long-range scope 103, and also coupled to the input of amplitude comparator 104. Amplitude comparator 104 operates with potentiometer 105 to provide a coarse range measuring system. The arm 106 of potentiometer 105 is mechanically coupled by shaft 107 through bevel gears 108 and 109 to range shaft 70. Potentiometer 105 produces a direct output voltage of waveform P on arm 106 having a magnitude which is determined by the setting of the arm under the control of shafts 70 and 107 and by the value of the fixed supply $+E_3$. The voltage $+E_3$ is maintained constant and equal to the peak value of the sawtooth voltage O.

A limit stop including a cam member 110 attached to shaft 107 and a stop 111 prevents the arm 106 of potentiometer 105 from damaging the potentiometer by limiting the amount of travel of shaft 107. Potentiometer 105 may be a one-turn linear potentiometer as shown or it may be a multi-turn helical potentiometer for greater accuracy.

Amplitude comparator 104 produces periodic coarse range or strobe pulses of waveform Q which occur at the instants that the instantaneous magnitude of the saw-tooth voltage of waveform O exceeds the magnitude of the applied direct voltage P from potentiometer arm 106. The frequency of these variably-delayed coarse ranging pulses is determined by the low-frequency generator 91 and is related, therefore, to the coding of the radar transmitter pulses of waveform M.

The time delay $\Delta t_3$ of the coarse ranging pulses of waveform Q as illustrated in FIG. 5 is related to the time delay $\Delta t_1$ of waveform D and $\Delta t_2$ of waveform H in the following manner. By virtue of the gearing of the coarse range potentiometer 105 through bevel gears 108 and 109 to the range shaft 70 which positions both fine range potentiometers 60 and 64, the rate of change of the delay $\Delta t_3$ is made identical to the rate of change of the delays $\Delta t_1$ and $\Delta t_2$. In addition, the absolute amount of the time delay intervals $\Delta t_1$ of waveform D and $\Delta t_2$ of waveform H throughout the first revolution of shaft 70 are identical to each other and exceed $\Delta t_3$ of waveform Q by a small fixed amount.

To achieve the above relationship, it is necessary that the ratio of the gears 108 and 109, the type of range potentiometer 105, and the slope of the saw-tooth voltage of waveform O be properly selected. In the embodiment of FIG. 4 where a linear one turn coarse range potentiometer 105 is shown, a speed ratio of 4:1 for the gears 109–108 has been selected where the full range of delay $\Delta t_3$ is to correspond to a delay equivalent to four periods ($4T_1$) of the basic timing wave A. For this condition, it is then necessary to maintain the magnitude of the reference voltage $+E_3$ applied to range potentiometer 105 equal to the peak magnitude of the saw-tooth voltage of waveform O. It is also important that the angular position of coarse range shaft 107 be properly aligned with shafts 61 and 65 of the fine ranging system.

The coarse ranging pulses of waveform Q are coupled to monostable multivibrator 112 which produces coarse range gating and blanking pulses of waveform R. These pulses are coupled over lead 113 to the combining circuit 114 and over lead 115 to gate circuit 116 and combining circuit 117.

Conventional radar receiver 120 receives reflected radar pulses from a radar antenna (not shown). The demodulated target pulses 12′–15′, transmitter pulses 12–15, and random noise of waveform S are coupled over lead 121 to the conventional automatic range tracking circuits 122 and over lead 123 to the gate circuit 124 and to A-scope 125.

The gated or coded timing pulses of waveform L from gate circuit 95 are coupled over lead 126 to a monostable multivibrator 127 which produces recurrent gating pulses of waveform T. These gated timing pulses of waveform L occur prior to the radar pulses of waveform M as a result of the time delay introduced by delay circuit 96. Thus, the monostable multivibrator 127 is initiated prior to the occurrence of the radar pulses of waveform M, and the gating pulses of waveform T straddle the radar pulses of waveform M. The gate circuit 124, therefore, gates out the received transmitter pulses 12–15 of waveform S which are coupled from transmitter 97 to receiver 120 and supplies only received target pulses 12′–15′ and noise to combining circuit 114. Combining circuit 114 combines these received target signals with the coarse variably-delayed range gate pulses of waveform R, and the resulting voltage illustrated as waveform U is coupled to the vertical deflection circuits of long-range scope 103.

The long-range scope 103 displays the received target pulses, noise, and coarse range gate pulses throughout the sweep of the low-frequency saw-tooth generator 100. The duration of the horizontal sweep exists for four periods $4T_1$ of the pulse repetition frequency of waveform A, and exists for five periods, $5T_2$, of the pulse repetition frequency of waveform E. The display of the long-range scope 103 for a target progressively increasing in range is illustrated in FIGS. 7a–7c as will be more fully explained hereinafter.

The received target pulses, transmitter pulses, and noise on lead 123 are coupled to the vertical deflection circuits of a conventional A-scope 125. The basic timing pulses of either waveform A or waveform E are coupled from relay arm 81 over leads 83 and 98 to PRF sweep generator 128 which produces a saw-tooth sweep voltage at the selected basic timing frequency. The waveform of the sweep voltage from generator 128 is similar to waveform B when relay arm 81 contacts relay terminal 55 and is similar to waveform F when the relay arm 81 contacts relay terminal 57. The saw-tooth sweep voltage at the selected basic timing frequency is coupled from sweep generator 128 over lead 129 to the horizontal deflection circuits of A-scope 125.

The ranging pulses at the basic pulse repetition frequency of either waveform D or waveform H are coupled through relay arm 82 and over lead 84 to monostable multivibrator 130 which produces range intensifying pulses of waveform V. Combining circuit 117 combines these intensifying pulses of waveform V with the coarse range pulses of waveform R to produce the voltage of waveform W which is coupled over lead 131 to the Z-axis of A-scope 125. The positive pulses of waveform W, corresponding to waveform V, intensify the display of A-scope 125 while the negative pulses, corresponding to waveform R, blank the display. The time position of both positive and negative pulses of waveform W are under the control of range shaft 70 and these pulses are used to select a target whose range is to be determined, as will be more fully explained hereinafter.

The ranging pulses of either waveform D or waveform H also are coupled through relay arm 82 and over lead 84 to gate circuit 116. The coarse range gating pulses of waveform R coupled to gate circuit 116 recurrently gate out selected pulses of waveforms D or H and couple the resultant wave through delay circuit 132 to the conventional automatic range tracking circuits 122 as voltage waveform X.

The automatic range tracking circuits automatically adjusts the angular position of range shaft 70 by means of shaft 133 and differential 134 to maintain the fine ranging pulses of waveform X substantially coincident with the selected target pulses 12′–15′ of waveform S to be tracked. The angular position of range shaft 70 is also under the control of handwheel 135 which drives through shaft 136, bevel gears 137 and 138, shaft 139 and differential 134. Shafts 136 and 139 are held stationary by a friction collar 140 when shaft 133 is positioning range shaft 70, and shaft 133 is maintained stationary when the automatic range tracking circuits 122 are de-energized thereby enabling handwheel 135 to position range shaft 70.

The operation of the long-range automatic tracking radar system of FIG. 4 may be understood by reference to the waveforms of FIGS. 5 and 6 and to the displays of the A-scope 125 and long-range scope 103 illustrated in FIGS. 7a–7c. The waveforms of FIGS. 5 and 6 and the displays of FIGS. 7a–7c have been presented to illustrate the operation of the invention in tracking a target increasing in range thereby causing the basic pulse repetition frequency to change from that illustrated as waveform A to a higher frequency illustrated as waveform E. The angular setting of the range shaft 70 as illustrated in FIG. 4 has been selected together with the range of the target being tracked such that the angular position of potentiometer arm 59 is slightly less than one revolution from its reference position and the angular position of potentiometer arm 63 is slightly greater than one revolution from its reference position. With these angular settings of potentiometer arms 59 and 63, the time delay $\Delta t_1$ of the fine ranging pulses of waveform D is less than the period $T_1$ of the basic pulse repetition frequency of waveform A, and the time delay $\Delta t_2$ of the fine ranging pulses of waveform H, which is equal to $\Delta t_1$, is less than the period $T_1$ but is greater than the period $T_2$, as illustrated in FIG. 5.

Throughout the first revolution of arm 59 up to the angular position as shown in FIG. 4, the relay 80 remains unenergized and the pulses of waveforms A and D of range unit 50 are used as the basic timing and ranging pulses, respectively, in the conventional manner. During this first revolution, the range of a target may be measured from near zero range up to almost the range corresponding to the period $T_1$ of the basic pulse repetition frequency of waveform A. The upper view of FIG. 7a shows the A-scope display for the target at a range corresponding to the setting of arm 59.

During the first revolution of arm 59 up to the angular position shown in FIG. 4, the range shaft 70 positions the coarse range potentiometer arm 106 through approximately one-quarter of a revolution. The coarse ranging pulses of waveform Q and the range gating or marking pulses of waveform R possess the time position as shown in FIG. 5. Since the coding of the radar pulses of waveform M consists in gating out a pulse at the frequency of the low-frequency generator 91, coarse ranging to the target being tracked is achieved by setting the marking pulse of waveform R to the "missing" target pulse. This is illustrated by the lower view of FIG. 7a showing the display of the long-range scope 103. In this view, the marking pulse has been set, under the control of range shaft 70 and potentiometer arm 106, so as to coincide with the missing target pulse. The time interval $\delta t_1$ of the A-scope display of FIG. 7a corresponds, therefore, with the time interval $\delta t_1$ of the long-range scope display of FIG. 7a. The long-range scope 103 provides a coarse visual indication of the range to the target.

The gating pulses of waveform T gate out the "main bang" or radar transmitter pulses and these pulses do not appear on the long-range scope. These "main bang" pulses are not, however, gated out in the A-scope display and appear at the left hand edge of the display as pulses 12–15.

The range intensifying pulses of waveform W are applied to the Z-axis of A-scope 125 to intensify the selected target pulses of the target to be tracked. When these intensifying pulses, which are under the control of range shaft 70, are positioned to coincide with and to intensify the target pulses 12′–15′ on the A-scope, the range indicator 73 provides an accurate indication of the range to the target and enables the automatic range tracking circuits 122 to assume automatic control of the positioning of range shaft 70 and, accordingly, the range indicator 73.

The automatic range tracking circuits 122 operate at the basic pulse repetition frequency of the radar system and not at the frequency of the low-frequency generator 91. When relay 80 is unenergized as illustrated in FIG. 4, the automatic range tracking circuits operate at the frequency of the fine ranging pulses of waveform D, and when relay 80 is energized the automatic range tracking circuits operate at the frequency of the fine ranging pulses of waveform H. The operation of the range tracking circuits at the basic pulse repetition frequency rather than at the coding frequency greatly improves the signal-to-noise ratio in automatically tracking a selected target due to the larger number of received target echo pulses per unit of time. The magnitude of this improvement in signal-to-noise ratio is better appreciated when it is realized that in a very-long range radar system the ratio of the basic pulse repetition frequency to the frequency of the coarse ranging pulses may be as high as 100 to 1.

As the range of the target increases, the potentiometer arm 59, under the control of range shaft 70 and shaft 61, approaches its dead zone. However, cam 76 raises contact arm 77 to engage contact 78 thereby energizing relay 80 which remains energized throughout the dead zone of potentiometer 60 which coincides with the region of transmitter interference with the received target pulses. During this interval relay arm 81 contacts terminal 57 and relay arm 82 contacts terminal 67. The basic pulse repetition frequency is increased and the pulses of waveform E and H of range unit 50 are used as the timing and ranging pulses, respectively.

The waveforms of FIG. 6 illustrate the operation of the invention of FIG. 4 at the increased pulse repetition frequency and where the range to the target is such that the time delay interval $\delta t_2$ approximately equals the period $T_1$ of the pulses of waveform A, i.e. the range at which transmitter interference would have occurred at the lower pulse repetition frequency. Where the waveforms of FIG. 6 differ from the corresponding waveforms of FIG. 5, as a result of the increase in pulse repetition frequency, they are identified by a prime.

With relay 80 energized and the arm 59 of potentiometer 60 positioned within its dead zone, the voltage at this arm, identified as waveform C′, is zero. The comparator 58 produces recurrent output pulses of waveform D′ although they are unused during this interval. The arm 63 of potentiometer 64 produces a direct output voltage of waveform G′ which determines the time delay of the variably-delayed output pulses of waveform H′. The coded radar transmitter output pulses of waveform M′ are produced from the pulses of waveforms E and I in the same general manner as the pulses of waveform M. The periodic coding or gating out of the radar pulses occurs at the same fixed frequency of low-frequency generator 91.

Low-frequency saw-tooth generator 100 produces the linear saw-tooth voltage of waveform O′ at the same fixed low frequency and with an amplitude equal to $+E_3$. The direct voltage of waveform P′ at the arm of the coarse range potentiometer is coupled to comparator 104 which produces coarse ranging pulses of waveform Q′. Since the operation of the low-frequency generator 91 and saw-tooth generator 100 is continuous and at a fixed frequency, the coarse ranging pulses of waveform Q′ differ from the pulses of waveform Q only by the amount of time delay.

The time delay $\delta t_2$ between the received target pulses 12′–16′ and their corresponding transmitter pulses 12–16 of waveform S′ is illustrated in FIG. 6 and in FIG. 7b. The time delay $\delta t_2$ approximately equals the period $T_1$ yet no transmitter interference occurs since the period of the basic timing pulses is now $T_2$. The A-scope display of the target being tracked in the upper view of FIG. 7b shows that the target pulse is intensified and that the automatic range tracking circuits 122, now operating at the higher pulse repetition frequency, continues to automatically track the target. The display of the long-range scope in the lower view of FIG. 7b shows that the coarse range to the "missing" pulse corresponds to the time interval $\delta t_2$.

After one revolution of range shaft 70 the potentiometer arm 59 has passed through the "dead zone" of potentiometer 60 and the cam 76 disenages the movable contact 77 from contact 78. Relay 80 returns to its unenergized condition and the original timing and ranging pulses of waveforms A and E from range unit 50 are supplied to the system. The range to the target being tracked has now increased to that illustrated by the displays of FIG. 7c. The coarse range marking pulses of waveform R, under the control of coarse range potentiometer 105, continue in alignment with the "missing" target pulse as illustrated in the lower view of FIG. 7c. Range indicator 73, therefore, continues to indicate the correct range of the target without ambiguity. Automatic tracking continues at the original pulse repetition frequency throughout the second revolution of range shaft 70 and potentiometer arm 59 as before, changing to the higher pulse repetition frequency only during the intervals that cam 76 closes contacts 77 and 78.

The embodiment of the invention illustrated in FIG. 4 is capable of continuous and unambiguous range tracking over four periods, $4T_1$, of the pulse repetition frequency of waveform A, corresponding to five periods at the pulse repetition frequency of waveform E. The invention is by no means limited to the embodiment of FIG. 4 but may be used to extend the range measuring capability of a radar system over many periods of the basic pulse repetition frequency and may employ more than two basic pulse repetition frequencies if desired. The invention has been found extremely useful in automatically tracking and ranging to targets at very great distances.

As many changes could be made in the above construction and many different embodiments of this invention could be made without departing from the scope thereof, it is intended that all matter in the above description or shown in the accompanying drawing shall be interpreted as illustrative and not in a limiting sense.

What is claimed is:

1. A radar transmitting system comprising in combination, a pulse repetition frequency generator producing recurrent reference output pulses, means including a radar transmitter coupled to the output of said pulse generator for transmitting recurrent radar pulses at the repetition frequency of said reference recurrent pulses, variable time delay means coupled to the output of said pulse generator, said variable time delay means producing delayed recurrent output pulses at the frequency of said pulse generator, said variable time delay means including means for varying the time delay interval between said delayed output pulses and said reference output pulses, and selector means coupled between said variable time delay means and said pulse generator, said selector means being responsive to the setting of said time delay means for changing the repetition frequency of said pulse generator from a first frequency to a second higher frequency when the time delay interval between said reference and delayed output pulses exceeds a predetermined amount.

2. The radar transmitting system as defined in claim 1 wherein said selector means changes the repetition frequency of said pulse generator from a first frequency to a second higher frequency when the time delay interval between said reference and delayed pulses is less than the period of said first repetition frequency and greater than the period of said second repetition frequency.

3. The radar transmitting system as defined by claim 2 wherein said selector means changes the repetition frequency of said pulse generator from said second higher frequency back to said first frequency when the time delay interval between said reference and delayed pulses is greater than the period of said first repetition frequency.

4. A radar transmitting system comprising in combination, a radar transmitter, a pulse generator means producing recurrent reference pulses coupled to said transmitter for recurrently keying said transmitter to produce recurrent radar pulses, said pulse generator means being alternately operable at first and second discrete repetition frequencies, variable time-delay means coupled to said pulse generator means, said variable time delay means being operable at either of said first and second discrete repetition frequencies and producing recurrent variably-delayed output pulses at the frequency of operation of said pulse generator, said variable time delay means including means for varying the time delay interval between said variably-delayed output pulses and said reference pulses, and selector means coupled between said variable time delay means and said pulse generator means, said selector means alternately operating said pulse generator means at said first and second discrete repetition frequencies as the time delay interval between said variably-delayed output pulses and said reference pulses increases by predetermined fixed increments.

5. A radar transmitting system comprising in combination, a radar transmitter, a pulse generator means coupled to said transmitter for recurrently keying said transmitter to produce recurrent radar pulses, said pulse generator means being sequentially operable at first and second discrete repetition frequencies, a range measuring unit coupled to said pulse generator means, said range measuring unit being operable at either of said first or second discrete repetition frequencies, selector means coupled between said range measuring unit and said pulse generator means, said selector means alternately switching said pulse generator between said first and second discrete repetition frequencies as the range indicated by said range measuring unit increases by predetermined fixed increments.

6. In a radar system, a range measuring system comprising in combination, a pulse repetition frequency generator means sequentially operable at first and second pulse repetition frequencies, said pulse generator means producing recurrent output reference pulses for keying a radar transmitter, variable time delay means coupled to said pulse generator means, said variable time delay means producing delayed recurrent output pulses at the frequency of said pulse generator, means coupled to said variable time delay means for varying the time delay interval between said delayed output pulses and said reference output pulses, range indicating means coupled to said variable time delay means, and selector means coupled between said variable time delay means and said pulse generator means, said selector means alternately switching the pulse repetition frequency of said pulse generator between said first and second pulse repetition frequencies as the intervals of range as indicated by said range indicating means increased by predetermined fixed increments.

7. In a radar system, the combination comprising a range measuring system selectively operable at a first pulse repetition frequency and a second higher pulse repetition frequency, said range measuring system producing recurrent reference output pulses and recurrent variably-delayed output pulses, means coupled to said range measuring system for indicating the range of an object to be measured, selector means coupled to said range measuring system and to said range indicating means and responsive to said range indicating means for selectively operating said range measuring system at said first pulse repetition frequency when the range indicated by said range indicating means is less than a first predetermined value and for selectively operating said range measuring system at said second higher pulse repetition frequency when the range indicated by said range indicating means is greater than said first predetermined value and less than a second predetermined value.

8. The radar system as defined by claim 7 wherein said selector means further selectively operates said range measuring system at said first pulse repetition frequency when the range indicated by said range indicating means is greater than said second predetermined value and less than a third predetermined value.

9. In a radar system, a range measuring system comprising in combination first and second range measuring units; each of said range measuring units including a reference pulse generator means producing recurrent pulses, each of said range measuring units further including variable time delay means coupled to its reference pulse generator means for producing delayed range pulses whose time delay varies according to range, the pulse repetition frequency of the pulse generator of said first range measuring unit being different from the pulse repetition frequency of the pulse generator of said second range measuring unit; means intercoupling said variable time delay means of said first and second range measuring units, and selector means coupled to said first and second range measuring units and to said intercoupling means for selecting the recurrent reference and delayed pulses from said first range measuring unit when the range to the object to be measured is less than a first predetermined value and for selecting the recurrent reference and delayed pulses from said second range measuring unit when the range of the object to be measured is greater than said first predetermined value and less than a second predetermined value.

10. In a radar system, a range measuring system comprising in combination, a reference pulse generator means producing recurrent reference pulses for triggering a radar transmitter, said pulse generator means including means for changing the pulse repetition frequency from a first value to a second value, first variable time delay means coupled to said pulse generator means and responsive to said first pulse repetition frequency pulses for producing first time delayed range pulses whose time delay varies according to range, second time delay means coupled to said pulse generator means and responsive to said second pulse repetition frequency pulses for producing second time delayed range pulses whose time delay varies according to range, means intercoupling said first and second variable time-delay means for indicating the range of an object to be measured, said intercoupling means being coupled to said reference generator means for changing the pulse repetition frequency thereof, and selector means coupled to said first and second variable time delay means and to said intercoupling means for selecting the time delayed output pulses from said first variable time delay means during the time that said reference generator means is producing pulses at said first pulse repetition frequency and selecting the time delayed output pulses from said second time delay means during the time that said reference generator means is producing pulses at said second pulse repetition frequency.

11. In a radar system, the combination comprising a first range measuring unit operable at a first pulse repetition frequency and a second pulse repetition frequency, a second range measuring unit operating at a third pulse repetition frequency substantially less than said first and second pulse repetition frequencies, means intercoupling said first and second range measuring units, said intercoupling means including indicator means for indicating the range of an object to be measured, selector means coupled to said first range measuring unit and to said range indicating means, said selector means being responsive to said range indicating means for selectively operating said first range measuring unit at said first pulse repetition frequency when the range indicated by said range indicating means is less than a first predetermined value, and for selectively operating said first range measuring unit at said second pulse repetition frequency when the range indicated by said range indicating means is greater than said first predetermined value and less than a second predetermined value, said second range measuring unit producing recurrent pulses for resolving the ambiguity of said first range measuring unit.

12. A range measuring system comprising in combination a range measuring unit operable at a first pulse repetition frequency and a second pulse repetition frequency, said range measuring unit producing recurrent reference output pulses and recurrent variably-delayed output pulses, shaft means coupled to said range measuring unit for varying the time delay between the variably-delayed output pulses and the reference output pulses, indicator means coupled to said shaft means for indicating the time delay between the variably-delayed output pulses and the reference output pulses, selector means coupled to said shaft means, and means coupling said selector means to said range measuring unit, said selector means being responsive to the angular position of said shaft means for selectively operating said range measuring unit at said first pulse repetition frequency when the time delay between the variably-delayed output pulses and the reference output pulses is less than a first predetermined value, said selector means selectively operating said range measuring unit at said second pulse repetition frequency when the time delay between the variably-delayed output pulses and the reference output pulses is greater than said first predetermined value and less than a second predetermined value.

13. The range measuring system as defined by claim 12 wherein said selector means coupled to said shaft means includes a cam operated switching device, said cam operated switching device being responsive to the angular position of said shaft means for selectively operating said range measuring unit.

14. A long-range radar transmitter system comprising in combination, pulse repetition frequency generator means, said pulse generator means producing recurrent radar trigger pulses, coding means coupled to the output of said pulse generator means, said coding means including means producing recurrent low-frequency coding signals at a frequency substantially less than the pulse repetition frequency of said pulse generator means, said coding means further including combining means for combining said recurrent trigger pulses and said recurrent low-frequency coding signals, radar transmitter means coupled to said coding means and responsive to the output of said combining means for producing coded radar transmitter output pulses, and variable time delay means coupled to said coding means, said variable time delay means producing delayed ranging pulses at the frequency of said coding signals.

15. A long-range radar system comprising in combination, radar transmitter means operable at a plurality of discrete pulse repetition frequencies, a range measuring unit coupled to said radar transmitter means, said range measuring unit being operable at each of said plurality of discrete repetition frequencies, selector means coupled between said range measuring unit and said radar transmitter means, said selector means operating said radar transmitter means at selected fixed repetition frequencies according to predetermined fixed intervals of range as indicated by said range measuring unit, coding means coupled to said radar transmitter means, said coding means periodically coding the recurrent radar output pulses, radar receiver means responsive to reflected radar pulses, first oscilloscope means coupled to the output of said radar receiver and to said range measuring unit, range ambiguity resolution means coupled to said coding means, and second oscilloscope means coupled to the output of said radar receiver and said range ambiguity resolution means.

16. In a radar system, the combination comprising a radar transmitter producing recurrent output radar pulses at a fixed repetition frequency, coding means coupled to said radar transmitter, said coding means periodically modifying certain of the recurrent radar output pulses at a frequency substantially less than the repetition frequency of said radar output pulses, and coarse range measuring apparatus coupled to said coding means and operating at the periodic coding frequency, said coarse range measuring apparatus being adapted for measuring and indicating the range of a remote object.

17. In a radar system, the combination comprising a pulse repetition frequency generator means, said pulse generator means producing recurrent radar trigger pulses, coding means coupled to the output of said pulse generator means, said coding means including means producing recurrent low-frequency coding signals at a frequency substantially less than the pulse repetition frequency of said pulse generator means, coarse range measuring apparatus coupled to said coding means for producing variably-delayed output signals at the periodic coding frequency, said coarse range measuring apparatus being adapted for measuring the time delay between transmitted coded pulses and corresponding received coded echo pulses, and fine range measuring apparatus coupled to said pulse generator means for producing variably-delayed output pulses at said pulse repetition frequency, said fine range measuring apparatus being adapted for measuring the time delay between transmitted pulses at the pulse repetition frequency and reflected echo pulses.

18. A long-range automatic tracking radar system comprising in combination, pulse repetition frequency generator means, a radar transmitter coupled to the output of said pulse generator means, said radar transmitter producing recurrent output radar pulses, coding means coupled to said transmitter, said coding means periodically coding the recurrent radar output pulses at a frequency substantially less than the repetition frequency of said radar output pulses, coarse range measuring apparatus coupled to said coding means for producing variably-delayed output signals at the periodic coding frequency, said coarse range measuring apparatus being adapted for measuring the time delay between transmitted coded pulses and corresponding received coded echo pulses, fine range measuring apparatus coupled to said pulse generator means for producing variably-delayed output pulses at said pulse repetition frequency, radar receiver means, automatic range tracking means coupled to the output of said radar receiver and to said fine range measuring apparatus, and means coupled from said automatic range tracking means to said fine range measuring system for automatically maintaining said variably-delayed output pulses at said pulse repetition frequency in coincidence with received echo pulses of an object being tracked.

19. A radar system including a radar transmitter, said radar transmitter simultaneously producing recurrent output pulses at a first pulse repetition frequency and a second pulse repetition frequency, first variable time delay means coupled to said radar transmitter, said first variable time delay means producing first ranging pulses at said first pulse repetition frequency, second variable time delay means coupled to said radar transmitter, said second variable time delay means producing ranging pulses at said second pulse repetition frequency, and range indicating means coupled to said first and second variable time delay means.

20. The radar system as defined by claim 19 further comprising means responsive to received target pulses and to said first ranging pulses for providing a coarse indication of the range to the target, and means responsive to the received target pulses and to said second ranging pulses for providing a fine indication of the range to the target.

21. A radar system comprising first and second pulse generator means operating at different frequencies, first and second range measuring units coupled respectively to said first and second pulse generator means, transmitter means coupled to said first and second pulse generator means, said transmitter means producing recurrent output pulses at the frequency of said first pulse generator means, said recurrent output pulses being coded at the frequency of said second pulse generator means, and means responsive to received coded target pulses and to said first and second range measuring units for indicating the range of the target.

22. In a pulse radar transmitting system including an antenna for radiating radar pulses, the combination comprising a radar transmitter adapted for generating uniformly spaced radar output pulses, coding means coupled to said radar transmitter for controlling said pulse radar transmitting system to recurrently omit radiating one of the uniformly spaced radar output pulses, and variable time delay means coupled to said coding means, said variable time delay means producing delayed ranging pulses at the recurring frequency that the radar pulses are omitted.

References Cited in the file of this patent

UNITED STATES PATENTS

| | | |
|---|---|---|
| 2,617,093 | Fyler | Nov. 4, 1952 |
| 2,669,711 | Moore | Feb. 16, 1954 |
| 2,736,892 | Moran | Feb. 28, 1956 |
| 2,790,166 | Buehrle et al. | Apr. 23, 1957 |
| 2,854,662 | Westwood | Sept. 30, 1958 |
| 2,946,050 | Wathen | July 19, 1960 |
| 2,981,942 | Gross | Apr. 25, 1961 |
| 3,023,409 | Smith et al. | Feb. 27, 1962 |
| 3,029,428 | Mattheus | Apr. 10, 1962 |